(12) United States Patent
Lee

(10) Patent No.: US 11,158,021 B2
(45) Date of Patent: Oct. 26, 2021

(54) SYSTEM AND METHOD FOR INTELLIGENT BLOCKCHAIN RIDE SHARING DISTRIBUTION OF AUTONOMOUS ELECTRIC VEHICLES

(71) Applicant: Edward Lee, Costa Mesa, CA (US)

(72) Inventor: Edward Lee, Costa Mesa, CA (US)

(73) Assignee: Alpha Motor Corporation, Irvine, CA (US)

( * ) Notice: Subject to any disclaimer, the term of this patent is extended or adjusted under 35 U.S.C. 154(b) by 385 days.

(21) Appl. No.: 16/421,369

(22) Filed: May 23, 2019

(65) Prior Publication Data
US 2020/0372601 A1 Nov. 26, 2020

(51) Int. Cl.
| | |
|---|---|
| *G06Q 50/30* | (2012.01) |
| *G06F 16/27* | (2019.01) |
| *G06Q 10/02* | (2012.01) |
| *B60L 53/51* | (2019.01) |
| *B60L 53/12* | (2019.01) |
| *G08G 1/00* | (2006.01) |
| *B60K 7/00* | (2006.01) |
| *G05D 1/02* | (2020.01) |

(52) U.S. Cl.
CPC ........... *G06Q 50/30* (2013.01); *B60K 7/0007* (2013.01); *B60L 53/12* (2019.02); *B60L 53/51* (2019.02); *G05D 1/021* (2013.01); *G06F 16/27* (2019.01); *G06Q 10/02* (2013.01); *G08G 1/202* (2013.01); *B60L 2220/44* (2013.01); *B60L 2240/70* (2013.01); *B60Y 2200/91* (2013.01); *B60Y 2300/91* (2013.01); *B60Y 2400/216* (2013.01)

(58) Field of Classification Search
CPC ........ G06Q 50/30; G06Q 10/02; G06F 16/27; B60L 53/12; B60L 53/51; B60L 2240/70; B60L 2220/44; B60K 7/0007; G05D 1/021; G08G 1/202; B60Y 2200/91; B60Y 2300/91; B60Y 2400/216
USPC .......................................................... 701/22
See application file for complete search history.

(56) References Cited

U.S. PATENT DOCUMENTS

| | | | |
|---|---|---|---|
| 10,612,262 B2 * | 4/2020 | Katanoda | E04H 6/42 |
| 2018/0013211 A1 * | 1/2018 | Ricci | H01Q 1/3266 |

* cited by examiner

*Primary Examiner* — Gertrude Arthur Jeanglaude

(57) ABSTRACT

A system and method for intelligent blockchain ride sharing distribution of autonomous electric vehicles. The electric vehicles accommodate commercial transport, public transport, and personal transport. The system and method includes a ride service network of autonomous, electric vehicles that are intelligently distributed through blockchain-regulated vehicle distribution means. The vehicle distribution means includes: on-demand, through reservations, and through traffic detection. A secure chain of data blocks from a blockchain represents the individual vehicle distribution transactions. The blockchain verifies that distribution of vehicles is efficient and accurate. The electric vehicles are defined by octagonal body frame powered by induction charging and/or solar energy charging of a battery for powering hub motors integrated into wheels at the outer corners of the body frame. The vehicles also include a circuit light made of dual horizontal light beams with a vertical connection, and a galvanized black color exterior surface for active inductive and solar charging.

20 Claims, 8 Drawing Sheets

SYSTEM AND METHOD FOR INTELLIGENT BLOCKCHAIN RIDE SHARING DISTRIBUTION OF AUTONOMOUS ELECTRIC VEHICLES

FIELD OF THE INVENTION

The present invention relates generally to a system and method for intelligent blockchain ride sharing distribution of autonomous electric vehicles. More so, the present invention relates to a peer-to-peer ridesharing and ride service hailing network of autonomous, electric vehicles that are intelligently distributed through at least one block-chain-regulated vehicle distribution means including: 1) on-demand, 2) through reservations, and 3) through traffic detection; whereby a secure chain of data blocks from a blockchain represent the individual vehicle distribution transactions; whereby the electric vehicles are variously sized and configured to accommodate commercial transport, public transport, and personal transport; and whereby the electric vehicles are defined by octagonal structure powered by induction charging and/or solar energy charging of a battery for powering motor integrated wheel hubs at the outer corners of the octagonal structure, and further defined by a circuit light made of dual horizontal light beams with a vertical connection, and a galvanized black color exterior surface for efficient and active solar charging.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, an electric vehicle operates solely on battery power and does not use an internal combustion engine alone or in combination with a battery to form a hybrid system. Often, a communication interface system is included in the electric vehicle to provide a complete plug since the electric vehicle relies exclusively on battery power to propel the vehicle is needed.

The rechargeable batteries that supply driving power to the electric vehicle form a considerable amount of the space and weight of the total vehicular weight and bulk, thereby restricting transport capacity of the vehicle which would be otherwise left available. Also, it is known in the art that the cattery capacity determines the driving range of the vehicle. Further, in recharging drained batteries, it becomes obligatory that the electric vehicle be rendered immobile for several hours on the average. This traditionally requires a stationary charging point, which may not always be available.

Other proposals have involved ride sharing systems with electrical vehicles. The problem with these electric vehicle ride sharing systems is that they do not provide autonomous vehicles. Also, they do not use blockchain technology to track the requests. Even though the above cited ride sharing systems with electrical vehicles meet some of the needs of the market, a system and method for intelligent blockchain ride sharing distribution of autonomous electric vehicles, is still desired.

SUMMARY

Illustrative embodiments of the disclosure are generally directed to a system and method for intelligent blockchain ride sharing distribution of autonomous electric vehicles. The system and method include a peer-to-peer ridesharing and ride service hailing network of autonomous, electric vehicles that are intelligently distributed through at least one blockchain-regulated vehicle distribution means. The vehicle distribution means includes: 1) on-demand, 2) through reservations, and 3) through traffic detection. A secure chain of data blocks from a blockchain represents the individual vehicle distribution transactions. The blockchain verifies that the distribution of vehicles is efficient and accurate.

The electric vehicles are variously sized and configured to accommodate commercial transport, public transport, and personal transport. The electric vehicles are defined by octagonal structure powered by induction charging and/or solar energy charging of a battery for powering motor integrated wheel hubs at the outer corners of the octagonal structure, and further defined by a circuit light made of dual horizontal light beams with a vertical connection, and a galvanized black color exterior surface for efficient and active solar charging.

In one aspect, a system and method for intelligent blockchain ride sharing distribution of autonomous electric vehicles, comprises:
  multiple electric vehicles having:
    a body frame defined by an octagonal shape and a galvanized dark-colored exterior surface;
    an illumination portion operable on the body frame;
    a chassis carrying the body frame, the chassis comprising a front portion defined by an interior cabin, the interior cabin having at least one seat, at least one communication interface operable with a computer having a software program;
    a pair of steerable front wheels disposed near the front portion of the chassis;
    at least two laterally spaced rear wheels;
    at least one hub motor operational with at least one of the wheels, the hub motor operational to drive the wheels;
    a battery operatively connected to the hub motor, the battery being at least partially charged through inductive charging through the galvanized dark-colored exterior surface of the body frame;
  at least one processor operable to regulate distribution of the electric vehicles; and
  a memory operatively coupled to the processor to form a given computing device that is part of a set of multiple computing nodes operable to maintain a secure chain of data blocks, the processor and memory configured to:
    maintain the secure chain of data blocks at the given computing node,
    whereby the secure chain of data blocks maintained at each computing node comprises one or more data blocks that respectively represent one or more vehicle distribution transactions associated with the vehicles;
    add at least one data block to the secure chain of data blocks maintained at the given computing node in response to determining that the vehicle distribution data is associated with the at least one data block is valid,
    whereby the vehicle distribution data is representative of the distribution of vehicles.

In another aspect, the system further comprises a portable communication device operable to communicate with the software program in the electric vehicle and a remote central control unit.

In another aspect, the portable communication device comprises an app for communicating with the software program and the remote central control unit.

In another aspect, the multiple electric vehicles comprise a first small electric vehicle, a second medium-sized electric vehicle, and a third large electric vehicle.

In another aspect, the dark-colored surface comprises a black color.

In another aspect, the interior cabin comprising a steering member operatively connected to at least one front wheel, at least one seat, at least one communication interface, and a computer having a software program.

In another aspect, the illumination portion comprises dual horizontal light beams with a vertical connection.

In another aspect, the vehicles comprise at least one photovoltaic solar panel disposed on the body frame, the photovoltaic solar panel being operatively connected to the battery for at least partially charging the battery.

In another aspect, the software program enables autonomous control of the vehicles.

In another aspect, the at least one processor is operable to regulate ride sharing distribution of the vehicles.

In another aspect, the hub motor is encompassed inside at least one of the wheels.

In another aspect, the electrical vehicles autonomously drive.

One objective of the present invention is to provide a flexible public transportation solution for urban environments.

Another objective is to use blockchain technology for seamless access and offers incentivization to frequent HUB users.

Another objective is to provide multiple types of electric vehicles that operate autonomously at low speeds within a 5-mile radius and can routinely service communities.

Another objective is to provide a clean energy vehicle with zero emissions.

Another objective is to power the vehicles through inductive charging and with solar panels on the roof.

Another objective is to allow users to request an electric vehicle through an app on a smart phone.

Yet another objective is to enable the app to request the appropriate electric vehicle on-demand, through reservations, and through traffic detection means.

Yet another objective is to provide traffic detection software directs the electric vehicles to high demand areas and reserves time for efficient maintenance.

Yet another objective is to provide inexpensive to manufacture electric vehicles operable for commercial transport, public transport, and personal transport.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 6A shows the right-side view, and FIG. 6B shows a sliding door opening from an opposite left side view, in accordance with an embodiment of the present invention;

Like reference numerals refer to like parts throughout the various views of the drawings.

DETAILED DESCRIPTION OF THE INVENTION

Figure 1:
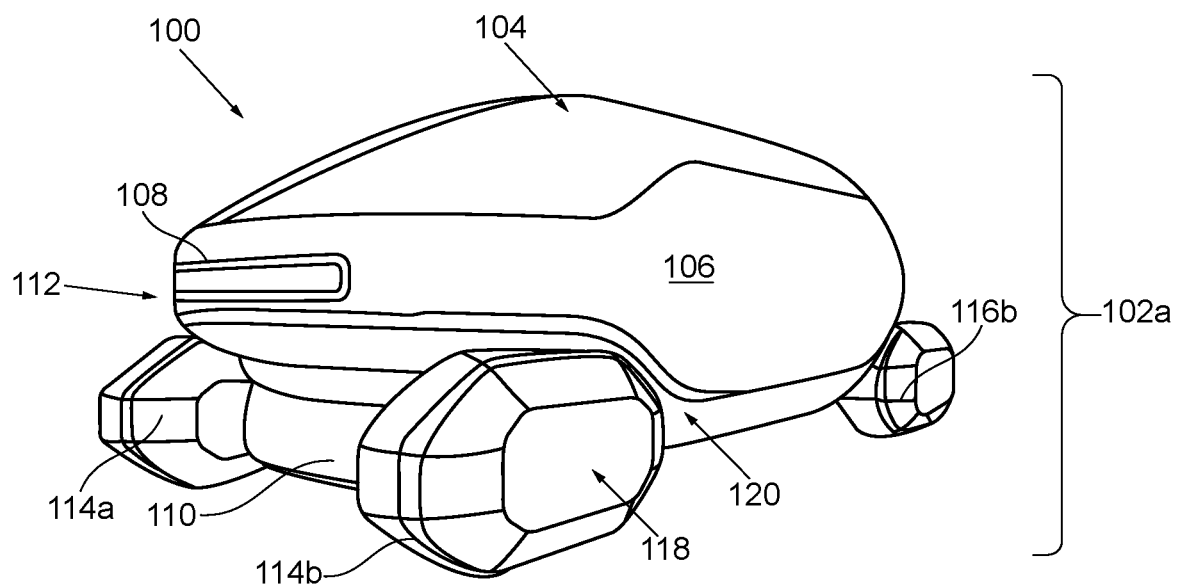
FIG. 1 illustrates a front perspective view of an exemplary electric vehicle for a system for intelligent blockchain ride sharing distribution of autonomous electric vehicles, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A system 100 and method 1000 for intelligent blockchain ride sharing distribution of autonomous electric vehicles 102a-c is referenced in FIGS. 1-10. The system 100 and method 1000 provides multiple electric vehicles 102*a-c* that accommodate commercial transport, public transport, and personal transport needs for ride a hailing service and peer-to-peer ride sharing. The system 100 and method includes a ride service network of autonomous, electric vehicles 102*a-c* that are intelligently distributed through blockchain-regulated vehicle distribution means. The vehicle distribution means can be requested through various means, including: 1) on-demand, 2) through reservations, and 3) through traffic detection. A secure chain of data blocks 06 from a blockchain 800 represents the individual vehicle distribution transactions. The blockchain verifies that distribution of vehicles is efficient and accurate.

In some embodiments, the electric vehicles 102*a-c* are defined by octagonal body frame 104 powered by induction charging and/or solar energy charging of a battery for powering hub motors integrated into wheels at the outer corners of the body frame 104. The electric vehicles 102*a-c* have a galvanized black exterior surface 106 for active inductive and solar charging. The vehicles also include a circuit light made of dual horizontal light beams with a vertical connection, and a As FIG. 1 references, the system 100 provides multiple electric vehicles 102*a-c*. The electric vehicles 102*a-c* operate autonomously at low speeds within a 5-mile radius and can routinely service communities. The electric configuration of the vehicles creates clean energy vehicle with zero emissions. The system 100 provides multiple sizes and dimensions of electric vehicles 102*a-c*. Each type of vehicle is appropriate for commercial transport, public transport, and personal transport; thereby providing a customizable ride a hailing service and peer-to-peer ride sharing. Thus, the electric vehicle can serve as any of the following: cargo transportation; a storage locker; commercial space; rideshare; lodging; public and private shuttle service; rental transportation; and a personal vehicle.

Figure 3:
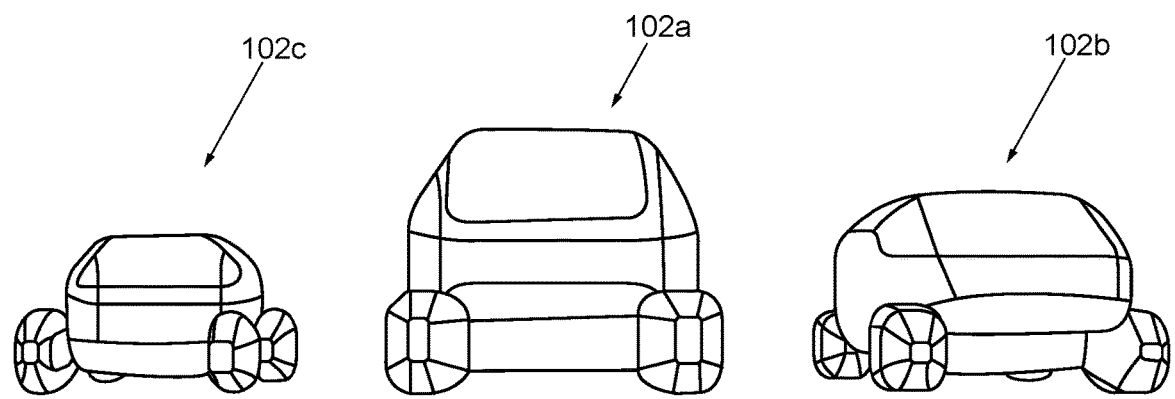
FIG. 3 illustrates a rear perspective view of the three sizes of electric vehicles, in accordance with an embodiment of the present invention.
Figure 4:
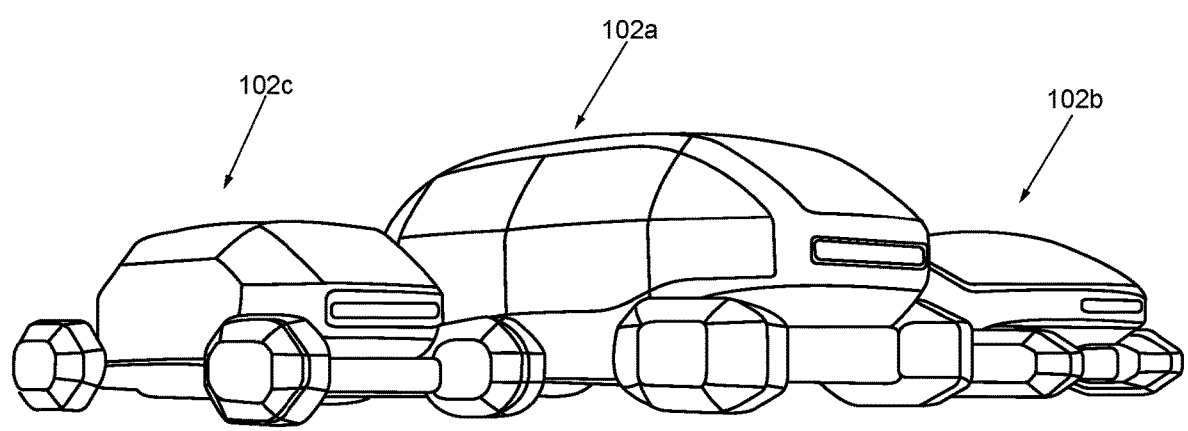
FIG. 4 illustrates a front perspective view of the three sizes of electric vehicles, in accordance with an embodiment of the present invention.

In one non-limiting embodiment shown in FIGS. 3 and 4, the electric vehicles 102*a-c* comprise a first small electric vehicle 102*c*, a second medium-sized electric vehicle 102*b*, and a third large electric vehicle 102*a*. Each sized vehicle serves a unique function. In this manner, the electric vehicles 102*a-c* is available in three different spaces with various levels of interior accommodations, which the user can select their preference of basic, comfort, and premium. In some embodiments, the interior of the electric vehicles 102*a-c* comfortably accommodates a maximum of six passengers with abundant cargo space. This may be for the larger vehicle 102*c*.

Figure 2:
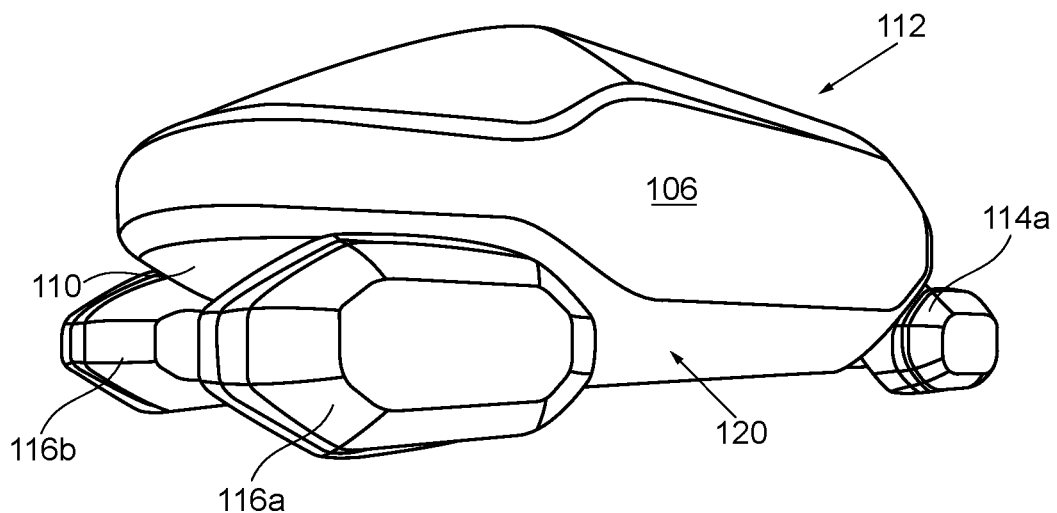
FIG. 2 illustrates a rear perspective view of the electric vehicle, in accordance with an embodiment of the present invention.
Figure 5:
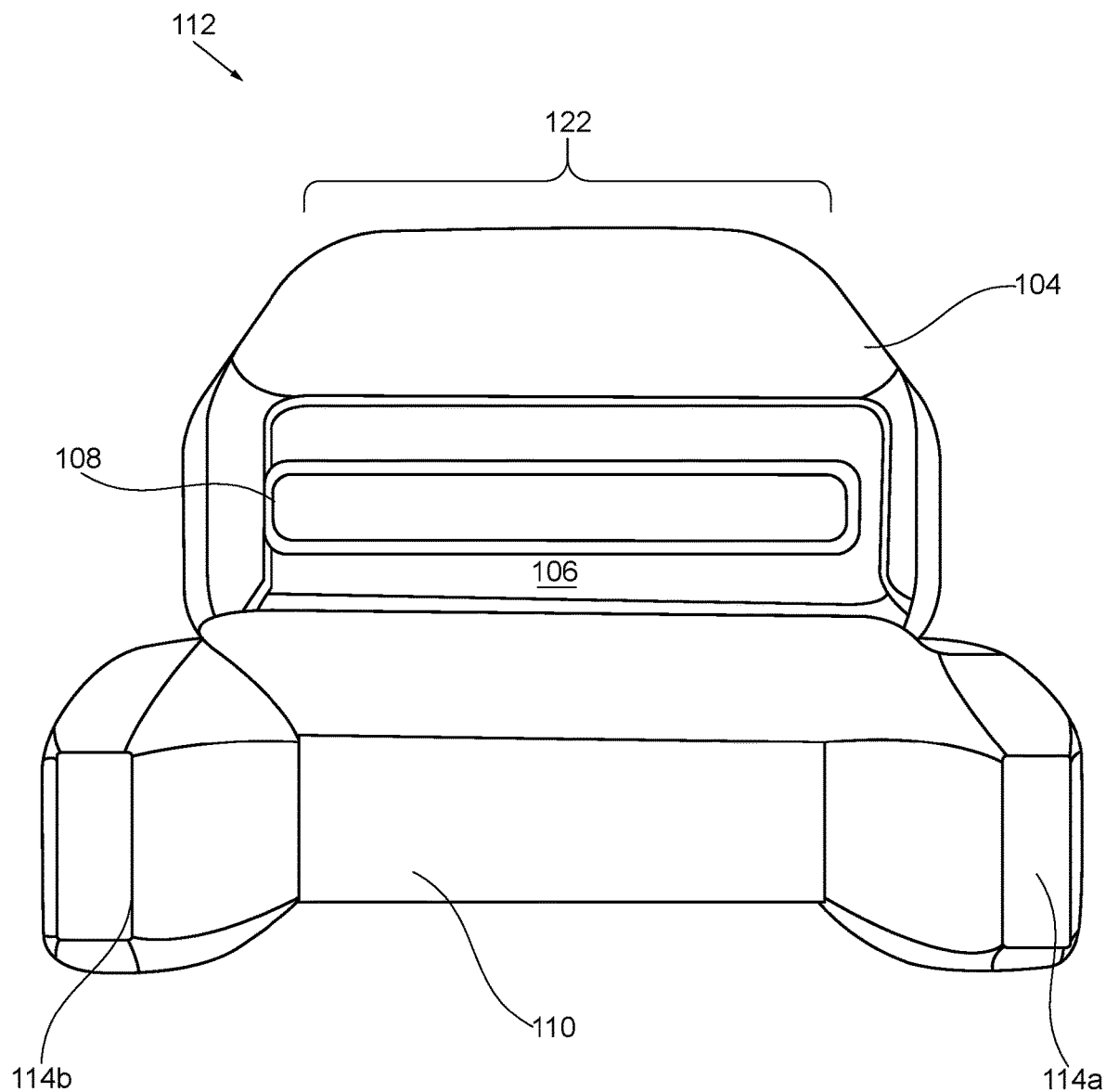
FIG. 5 illustrates a front view of the electric vehicle, in accordance with an embodiment of the present invention.

As FIGS. 1 and 2 illustrate, the electric vehicles 102*a-c* have body frame 104 defined by an octagonal shape and a galvanized dark-colored exterior surface 106. The octagonal shape is unique to this specific electric vehicle described herein. The octagonal shape creates a chassis 110 that is set low for a stable center of gravity and enables efficient induction charging. Another unique feature is an illumination portion 108 operable on the body frame 104. In one non-limiting embodiment, illumination portion 108 comprises dual horizontal light beams with a vertical connection (FIG. 5). However in other embodiments, the illumination portion 108 can have other shapes and be white, yellow, flashing, or other colors and patterns known in the art.

Figure 6A:
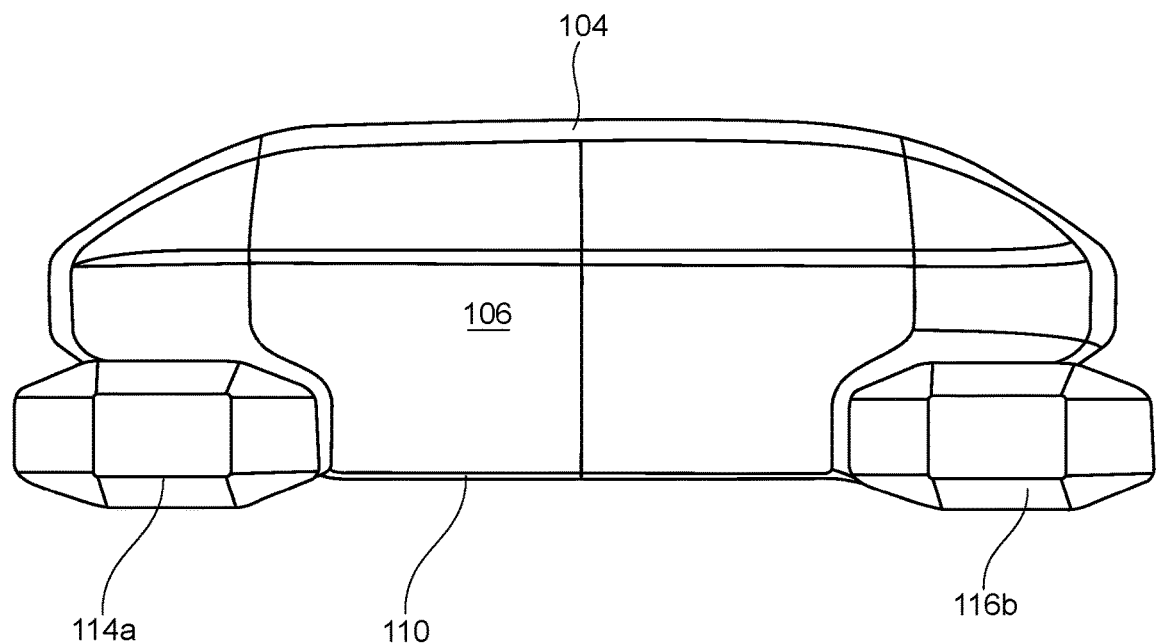
FIGS. 6A and 6B illustrate side views of the electric vehicle, where
Figure 10:
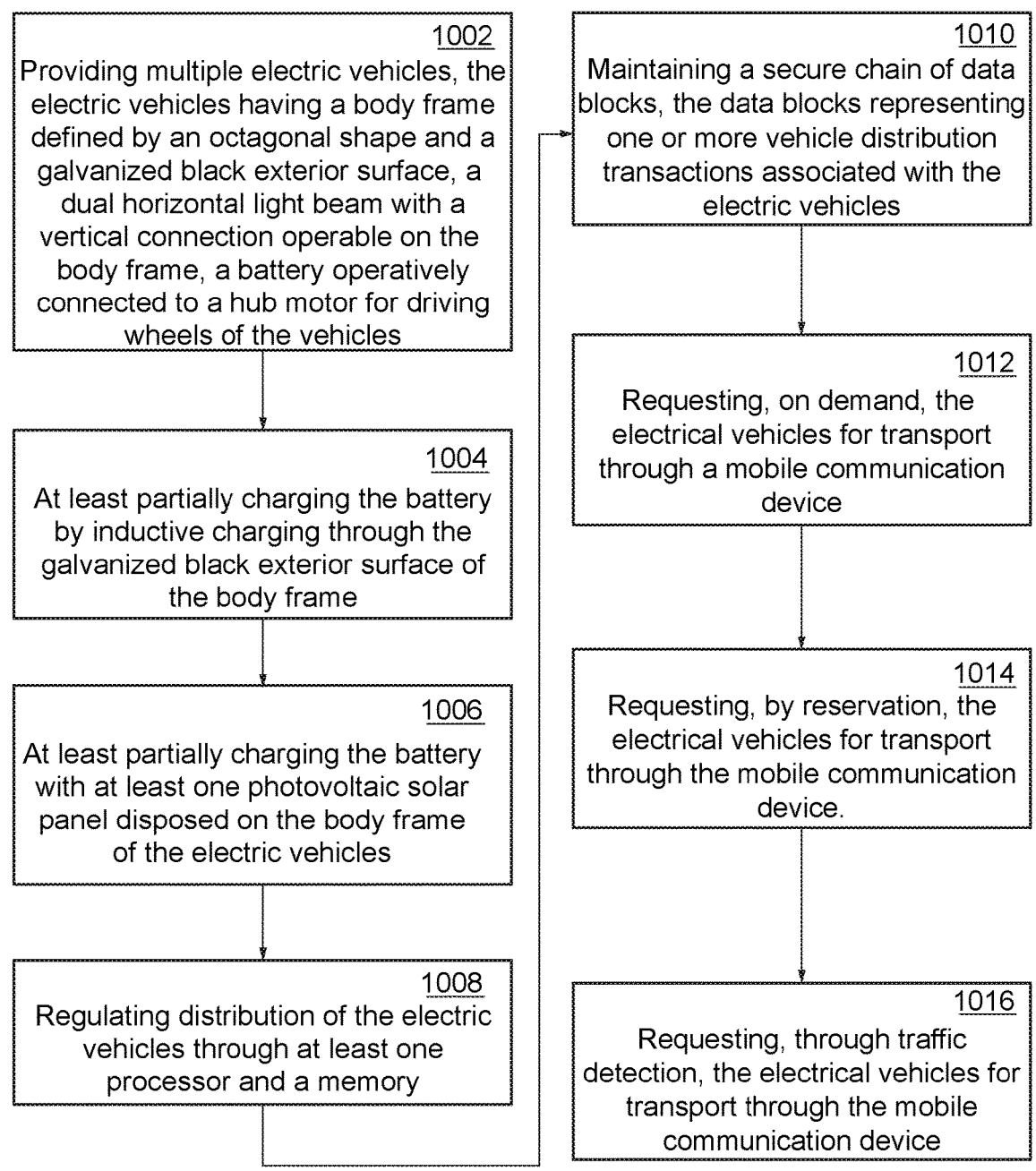
FIG. 10 illustrates a flowchart of an exemplary method for intelligent blockchain ride sharing distribution of autonomous electric vehicles, in accordance with an embodiment of the present invention.

Continuing with the design of the electric vehicle, FIG. 6A illustrates one side of the electric vehicle, showing a chassis 110 that carries the body frame 104. The chassis 110 is the supportive structure. The chassis 110 also comprises a front portion 112 defined by an interior cabin 700, where the passengers sit during transport. As FIG. 10 shows, the interior cabin may contain a pair of bench seats 1000*a*, 1000*b* for the passengers to sit while being transported.

Figure 6B:
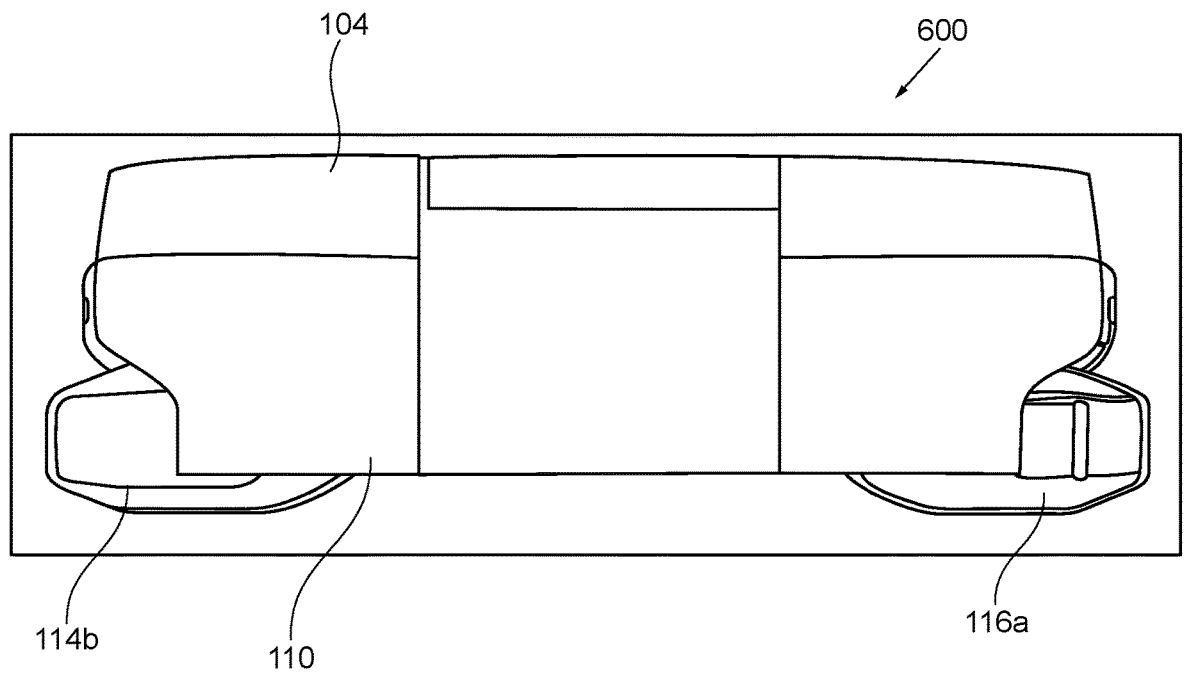
Figure 7A:
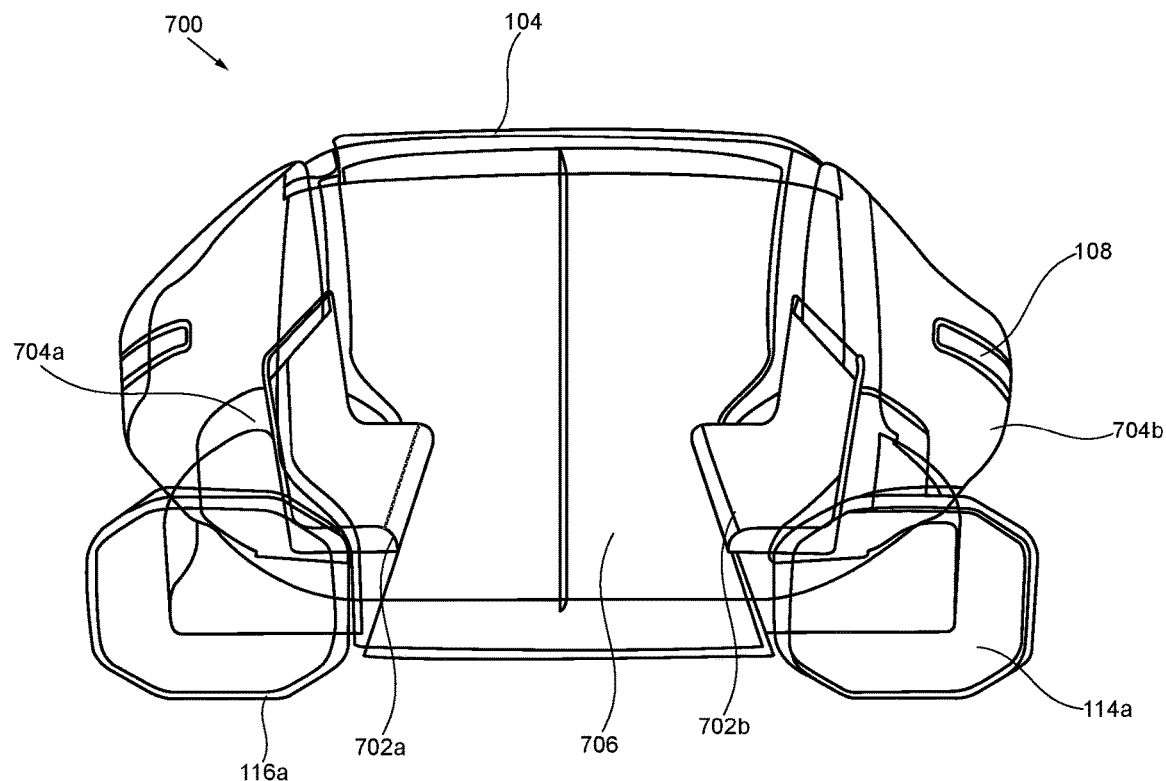
FIGS. 7A and 7B illustrate an exemplary interior cabin of the electric vehicle containing a pair of bench seats, a pair of cargo storage areas, and a removable partition, in accordance with an embodiment of the present invention.
Figure 7B:
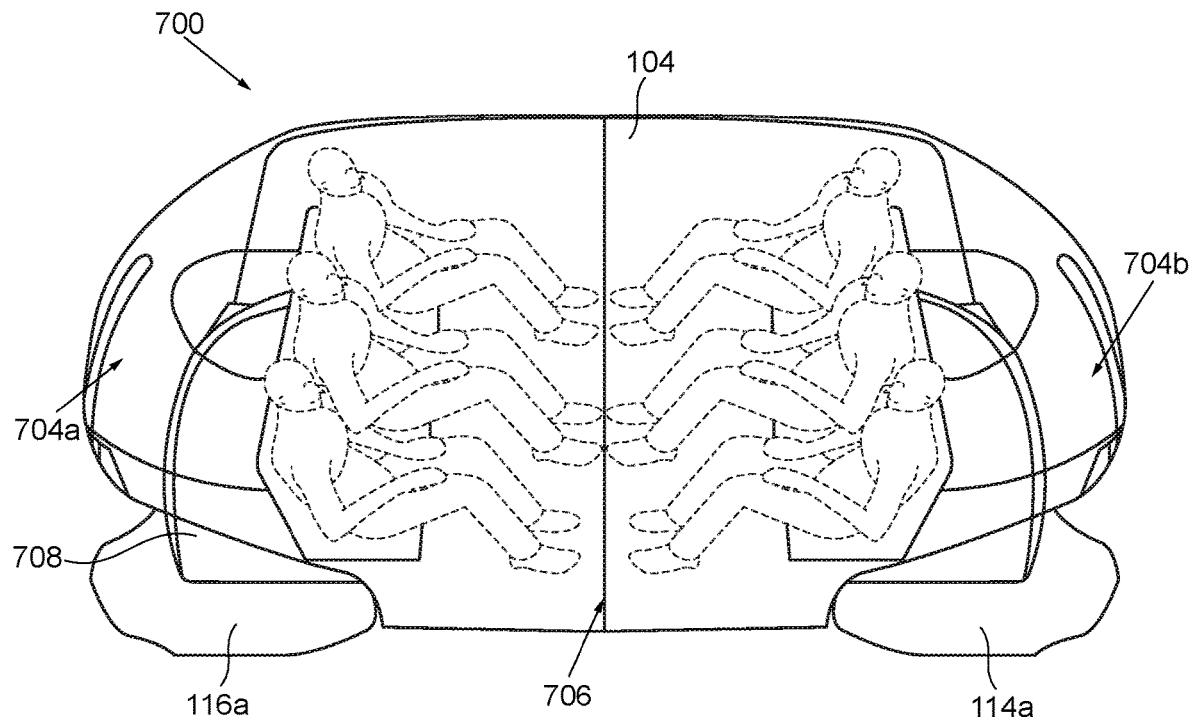

As shown in FIG. 6B, a sliding door 600 enables entry and exit from the interior cabin 700 of the electric vehicle. The sliding door 600 may be powered from the interior cabin, or operable to open and close remotely. As FIG. 7A illustrates, the interior cabin 700 includes a pair of bench seats 702*a*, 702*b* for the passengers to sit comfortably during transport. The bench seats 702*a*, 702*b* face each other so that the passengers may be positioned face-to-face, as shown in FIG. 7B. However in other embodiments, the bench seats 702*a-b* may all be facing the same direction. Interior cabin 700 may also include a pair of cargo storage areas 704*a*, 704*b* at opposing ends of the body frame 104 for storing suitcase, supplies, equipment, and the like.

In yet another embodiment of electric vehicle 102*a-c*, the interior cabin 700 provides a removable partition 706 at the feet of the passengers that creates a height-adjustable horizontal platform for additional comfort and support. In alternative embodiments, the interior cabin 700 further includes at least one communication interface, such as a touch screen, operable with a computer 708 having a software program. The software program enables autonomous control of the electric vehicles 102*a-c*.

Those skilled in the art will recognize that use of an electric vehicles 102*a-c* to contribute to the widespread advancement and adoption of autonomous vehicles because: 1) Technology-focused early adopters want both innovations in the same car; 2) It is easier to implement autonomous features on EVs (e.g. fewer moving pieces); 3) Wireless charging integrates seamlessly with autonomy; and 4) More efficient self-driving extends range, which is an EV pain point. Thus, the present ridesharing system 100 and method 1000 utilizes the autonomous electric vehicles 102*a-c*.

In addition to the above taught components of the chassis 110, a pair of steerable front wheels 114*a*, 114*b* are disposed near the front portion 112 of the chassis 110. At least two laterally spaced rear wheels 116*a*, 116*b* support the rear of the chassis 110. As illustrated in FIG. 2, the wheels may have an elongated shape, and include pneumatic tires, rigid rollers, tracks, or other rolling motion mechanism known in the art. At least one hub motor 118 is operational with at least one of the wheels. The hub motor 118 drives the wheels 114*a-b*, 116*a-b*. In one embodiment, the hub motor 118 is encompassed inside at least one of the wheels.

To power the hub motor, the system 100 provides a battery 120, which may be rechargeable through inductive charging, and/or solar energy panels. The battery 120 operatively connects to the hub motor 118 for charging thereof. The battery 120 is at least partially charged through inductive charging through the galvanized dark-colored exterior surface of the body frame 104. The dark color may include a black color. The battery 120 may include, without limitation, a lead-acid battery, a nickel metal hydride, a lithium-ion battery.

In addition, the electric vehicles 102*a-c* comprise at least one photovoltaic solar panel 122 is operational on the body frame 104, such as on the roof, for example. The photovoltaic solar panel 122 is operatively connected to the battery for at least partially charging the battery through solar means. Those skilled in the art will recognize that electric-vehicle batteries differ from starting, lighting, and ignition (SLI) batteries because they are designed to give power over sustained periods of time. Deep-cycle batteries are used instead of SLI batteries for the electric truck system 100.

Figure 8:
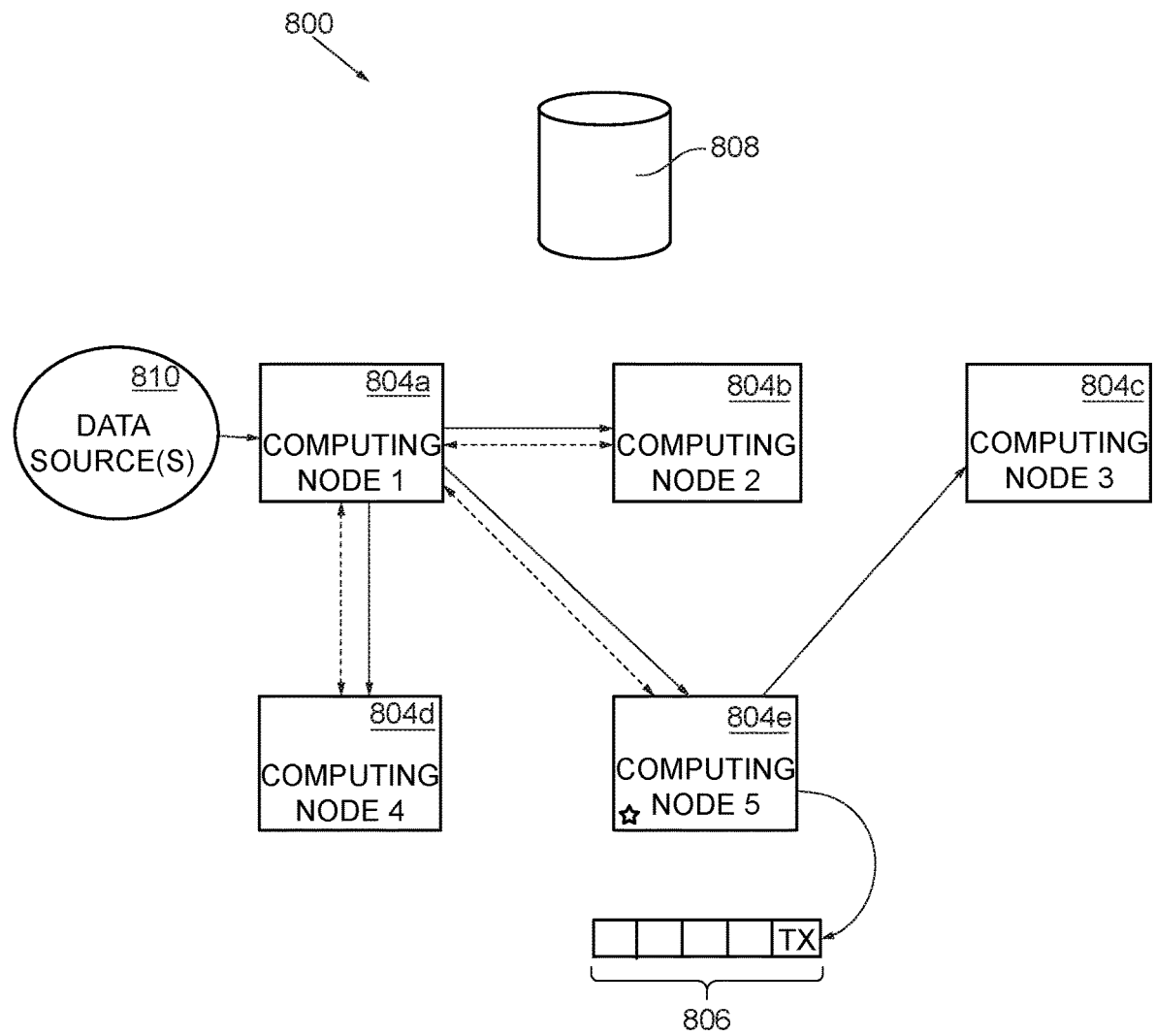
FIG. 8 illustrates a block diagram of a blockchain verification system, in accordance with an embodiment of the present invention.

Turning now to FIG. 8, the system regulates the electric vehicle distribution with the help of a Blockchain 800, and related blockchain technology known in the art. Those skilled in the art will recognize that Blockchain 800 is a technology that enables creation of a digital ledger or record of transactions and sharing of this ledger among a distributed network of computers. For this purpose, the system 100 includes at least one processor 810 that is operable to regulate distribution of the electric vehicles. The processor 810 is operable to regulate ride sharing distribution of the vehicles. Further, a memory 808 operatively couples to the processor 810 to form a given computing device that is part of a set of multiple computing nodes 804a, 804b, 804c, 804d, 804e operable to maintain a secure chain of data blocks 806.

In some embodiments, the processor 810 and memory 808 are configured to maintain the secure chain of data blocks 806 at the given computing node 804a. The secure chain of data blocks 806 are maintained at each computing node comprises one or more data blocks that respectively represent one or more vehicle distribution transactions associated with the vehicles. Further, the processor and memory are configured to add at least one data block to the secure chain of data blocks maintained at the given computing node in response to determining that the vehicle distribution data is associated with the at least one data block is valid.

Advantages of such a blockchain computation for ride sharing can include: the ability for independent nodes to converge on a consensus of a latest version of a large data set (e.g., a ledger), even when the nodes are run anonymously, have poor interconnectivity and may have operators who are dishonest or otherwise malicious; a prohibitively high cost to attempt to rewrite or otherwise alter transaction history; and automated conflict resolution that ensures that conflicting transactions never become part of the confirmed data set. In this manner, the vehicle distribution data in the data blocks are representative of the distribution of vehicles.

Figure 9A:
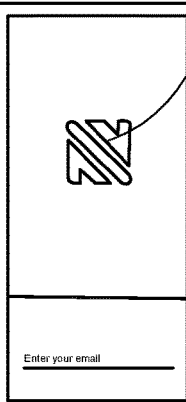
FIGS. 9A-9F illustrates screen shots of a portable communication device with a software app for requesting the electric vehicles for ride sharing means, in accordance with an embodiment of the present invention.
Figure 9B:
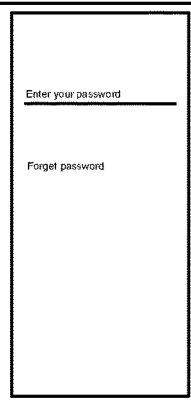
Figure 9C:
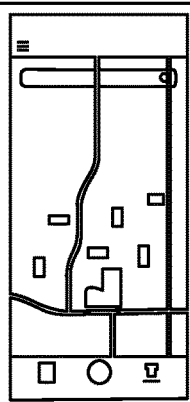

Turning now to FIG. 9A-9F, the system further comprises a portable communication device 900 operable to communicate with the software program in the electric vehicle and a remote central control unit. The portable communication device 900 comprises an app for communicating with the software program 914 and the remote central control unit 916. As FIG. 9A shows, the user commands the app to request a vehicle starting from a starting screen 902. Next, as FIG. 9B shows, a registration page 904 displays to allow the user to sign in and verify payment options. Turning now to FIG. 9C, a map screen 906 displays to show the user's area displays with the location of various electric vehicles.

Figure 9D:
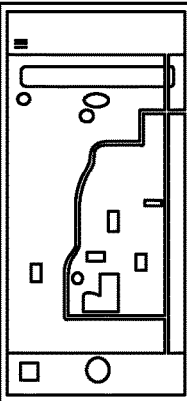
Figure 9E:
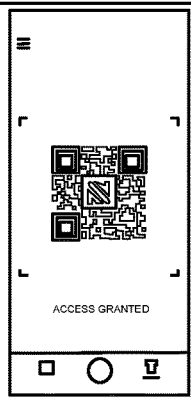
Figure 9F:
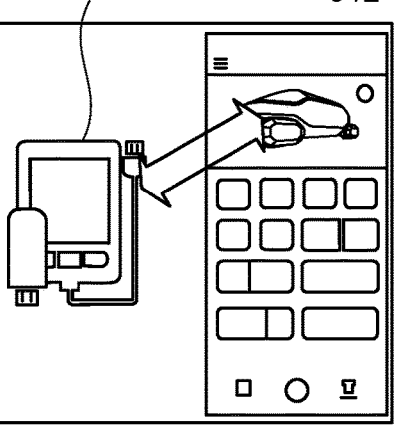

Continuing with the app, a traffic detection software directs the electric vehicles to high demand areas and reserves time for efficient maintenance. Thus, the position of the electric vehicles displays on a status page 908, as shown in FIG. 9D. A verification screen 910, shown in FIG. 9E, grants access to the user, upon payment verification. Finally, a vehicle arrival screen 912 displays the type of vehicles available and the selected electric vehicle (FIG. 9F). The vehicle position is in contact with the remote central control unit 916.

FIG. 10 illustrates a flowchart diagram of an exemplary method 1000 for intelligent blockchain ride sharing distribution of autonomous electric vehicles. The method 1000 may include an initial Step 1002 of providing multiple electric vehicles, the electric vehicles having a body frame defined by an octagonal shape and a galvanized black exterior surface, a dual horizontal light beam with a vertical connection operable on the body frame, a battery operatively connected to a hub motor for driving wheels of the vehicles.

The method 1000 may further comprise a Step 1004 of at least partially charging the battery by inductive charging through the galvanized black exterior surface of the body frame. A Step 1006 includes at least partially charging the battery with at least one photovoltaic solar panel disposed on the body frame of the electric vehicles. In some embodiments, a Step 1008 comprises regulating distribution of the electric vehicles through at least one processor and a memory. A Step 1010 includes maintaining a secure chain of data blocks, the data blocks representing one or more vehicle distribution transactions associated with the electric vehicles.

In some embodiments, a Step 1012 may include requesting, on demand, the electrical vehicles for transport through a mobile communication device. A Step 1014 comprises requesting, by reservation, the electrical vehicles for transport through the mobile communication device. A final Step 1016 includes requesting, through traffic detection, the electrical vehicles for transport through the mobile communication device.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process Thus, when a user requires express service and their dedicated electric vehicle is occupied, the nearest HUB will automatically service the user. Traffic detection software directs the electric vehicle to high demand areas and reserves time for efficient maintenance. The system provides is a versatile transportation solution created for multipurpose use. In this manner, the user has many options for riding the vehicle, including: cargo transportation; a storage locker; commercial space; rideshare; lodging; public and private shuttle service; rental transportation; and a personal vehicle.

In conclusion, the system and method for intelligent blockchain ride sharing distribution of autonomous electric vehicles. The electric vehicles accommodate commercial transport, public transport, and personal transport. The system and method includes a ride service network of autonomous, electric vehicles that are intelligently distributed through blockchain-regulated vehicle distribution means. The vehicle distribution means includes: on-demand, through reservations, and through traffic detection.

Further, a secure chain of data blocks from a blockchain represents the individual vehicle distribution transactions. The blockchain verifies that distribution of vehicles is efficient and accurate. The electric vehicles are defined by octagonal body frame powered by induction charging and/or solar energy charging of a battery for powering hub motors integrated into wheels at the outer corners of the body frame. The vehicles also include a circuit light made of dual horizontal light beams with a vertical connection, and a galvanized black color exterior surface for active inductive and solar charging.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A system for intelligent blockchain ride sharing distribution of autonomous electric vehicles, the system comprising:
multiple electric vehicles having:
a body frame defined by an octagonal shape and a galvanized dark-colored exterior surface;
an illumination portion operable on the body frame;
a chassis carrying the body frame, the chassis comprising a front portion defined by an interior cabin, the interior cabin having at least one seat, at least one communication interface operable with a computer having a software program;
a pair of steerable front wheels disposed near the front portion of the chassis;
at least two laterally spaced rear wheels;
at least one hub motor operational with at least one of the wheels, the hub motor operational to drive the wheels;
a battery operatively connected to the hub motor, the battery being at least partially charged through inductive charging through the galvanized dark-colored exterior surface of the body frame;
at least one processor operable to regulate distribution of the electric vehicles; and
a memory operatively coupled to the processor to form a given computing device that is part of a set of multiple computing nodes operable to maintain a secure chain of data blocks, the processor and memory configured to:
maintain the secure chain of data blocks at the given computing node,
whereby the secure chain of data blocks maintained at each computing node comprises one or more data blocks that respectively represent one or more vehicle distribution transactions associated with the electric vehicles;
add at least one data block to the secure chain of data blocks maintained at the given computing node in response to determining that the vehicle distribution data is associated with the at least one data block is valid,
whereby the vehicle distribution data is representative of the distribution of the electric vehicles.

2. The system of claim 1, wherein the multiple electric vehicles comprise a first small electric vehicle, a second medium-sized electric vehicle, and a third large electric vehicle.

3. The system of claim 1, wherein the multiple electric vehicles comprise at lest one of the following: commercial vehicles, public vehicles, and personal vehicles.

4. The system of claim 1, wherein the dark-colored surface of the body frame comprises a black color.

5. The system of claim 1, wherein the illumination portion comprises dual horizontal light beams with a vertical connection.

6. The system of claim 1, wherein the hub motor is encompassed inside at least one of the wheels.

7. The system of claim 1, further comprising at least one photovoltaic solar panel disposed on the body frame of the electric vehicles, the photovoltaic solar panel being operatively connected to the battery for at least partially charging the battery.

8. The system of claim 1, wherein the at least one processor is operable to regulate ride sharing distribution of the electric vehicles.

9. The system of claim 1, wherein the interior cabin comprises a pair of bench seats, a pair of cargo storage areas, a removable partition, and a computer having a software program.

10. The system of claim 9, wherein the software program is operable to enable autonomous control of the vehicles.

11. The system of claim 10, further comprising a portable communication device operable to communicate with the software program in the electric vehicle and a remote central control unit.

12. The system of claim 11, wherein the portable communication device comprises a software application for communicating with the software program and the remote central control unit.

13. The system of claim 12, wherein the body frame comprises a sliding door operable to regulate entry to the interior cabin.

14. A system for intelligent blockchain ride sharing distribution of autonomous electric vehicles, the system comprising:
multiple electric vehicles having:
a body frame defined by an octagonal shape and a galvanized black exterior surface, the body frame comprising a sliding door;
a dual horizontal light beam with a vertical connection operable on the body frame;
a chassis carrying the body frame, the chassis comprising a front portion defined by an interior cabin, the interior cabin having at least one seat, at least one communication interface operable with a computer having a software program;
a pair of steerable front wheels disposed near the front portion of the chassis;
at least two laterally spaced rear wheels;
at least one hub motor operational with at least one of the wheels, the hub motor operational to drive the wheels;
a battery operatively connected to the hub motor, the battery being at least partially charged through inductive charging through the galvanized black exterior surface of the body frame;
at least one photovoltaic solar panel disposed on the body frame of the electric vehicles, the photovoltaic solar panel being operatively connected to the battery for at least partially charging the battery;
at least one processor operable to regulate distribution of the electric vehicles; and
a memory operatively coupled to the processor to form a given computing device that is part of a set of multiple computing nodes operable to maintain a secure chain of data blocks, the processor and memory configured to:
maintain the secure chain of data blocks at the given computing node,
whereby the secure chain of data blocks maintained at each computing node comprises one or more data blocks that respectively represent one or more vehicle distribution transactions associated with the electric vehicles;
add at least one data block to the secure chain of data blocks maintained at the given computing node in response to determining that the vehicle distribution data is associated with the at least one data block is valid, whereby the vehicle distribution data is representative of the distribution of the electric vehicles.

15. The system of claim 14, wherein the at least one processor is operable to regulate ride sharing distribution of the electric vehicles.

16. The system of claim 14, wherein the interior cabin comprises a pair of bench seats, a pair of cargo storage areas, a removable partition, and a computer having a software program.

17. The system of claim 16, wherein the software program is operable to enable autonomous control of the vehicles.

18. The system of claim 17, further comprising a portable communication device operable to communicate with the software program in the electric vehicle and a remote central control unit.

19. The system of claim 18, wherein the portable communication device comprises a software application for communicating with the software program and the remote central control unit.

20. A method for intelligent blockchain ride sharing distribution of autonomous electric vehicles, the method comprising:
provided multiple electric vehicles, the electric vehicles having a body frame defined by an octagonal shape and a galvanized black exterior surface, a dual horizontal light beam with a vertical connection operable on the body frame, a battery operatively connected to a hub motor for driving wheels of the vehicles;
at least partially charging the battery by inductive charging through the galvanized black exterior surface of the body frame;
at least partially charging the battery with at least one photovoltaic solar panel disposed on the body frame of the electric vehicles;
regulating distribution of the electric vehicles through at least one processor and a memory;
maintaining a secure chain of data blocks, the data blocks representing one or more vehicle distribution transactions associated with the electric vehicles;
requesting, on demand, the electrical vehicles for transport through a mobile communication device;
requesting, by reservation, the electrical vehicles for transport through the mobile communication device; and
requesting, through traffic detection, the electrical vehicles for transport through the mobile communication device.

* * * * *